United States Patent [19]

Mangat et al.

[11] Patent Number: 5,605,869

[45] Date of Patent: * Feb. 25, 1997

[54] GLASS COMPOSITIONS

[75] Inventors: Harbans K. Mangat; Peter J. Smith, both of Oxfordshire; Richard J. Hall; Shaun Wingfield, both of Staffordshire, all of United Kingdom

[73] Assignee: Cookson Matthey Ceramics & Materials Limited, London, United Kingdom

[*] Notice: The term of this patent shall not extend beyond the expiration date of Pat. No. 5,308,803.

[21] Appl. No.: 380,586

[22] Filed: Jan. 30, 1995

[30] Foreign Application Priority Data

Jan. 31, 1994 [GB] United Kingdom ............... 9401818

[51] Int. Cl.$^6$ .............................................. C03C 1/00
[52] U.S. Cl. .............................. 501/14; 501/17; 501/21; 501/66; 501/67; 428/426
[58] Field of Search ............................. 501/14, 17, 21, 501/66, 67; 428/426

[56] References Cited

U.S. PATENT DOCUMENTS

| | | |
|---|---|---|
| 4,282,035 | 8/1981 | Nigrin . |
| 4,446,241 | 5/1984 | Francel et al. ........................... 501/14 |
| 4,554,258 | 11/1985 | Francel ..................................... 501/21 |
| 4,590,171 | 5/1986 | Nigrin ...................................... 501/25 |
| 4,892,847 | 1/1990 | Reinherz ................................. 501/14 |
| 4,970,178 | 11/1990 | Klimas et al. . |
| 5,200,369 | 4/1993 | Clifford et al. ......................... 501/66 |
| 5,244,848 | 9/1993 | Clifford et al. ......................... 501/66 |
| 5,308,803 | 5/1994 | Clifford et al. ......................... 501/17 |

FOREIGN PATENT DOCUMENTS

| | | |
|---|---|---|
| 0267154 | 5/1988 | European Pat. Off. . |
| 0452065 | 10/1991 | European Pat. Off. . |
| 0518610 | 12/1992 | European Pat. Off. . |
| 2250285 | 6/1992 | United Kingdom . |

OTHER PUBLICATIONS

Chemical Abstracts, vol. 110, No. 6, 20 Mar. 1989.

*Primary Examiner*—Karl Group
*Attorney, Agent, or Firm*—Watson Cole Stevens Davis, P.L.L.C.

[57] ABSTRACT

An on-glaze low expansion glass flux composition suitable for coating onto a glazed surface which is essentially free from lead and cadmium and comprises, in mole percent, $SiO_2$ : 35 to 75%, $Bi_2O_3$ : 4 to 12%, $Al_2O_3$ : 2 to 12%, $B_2O_3$ : 18 to 35%, at least one of $Li_2O$, $Na_2O$, $K_2O$ : 0 to 12% (in total), and certain other optional ingredients with the provisos that BaO is not contained in an amount of more than 2 mole percent, the total amount of $Bi_2O_3+B_2O_3+Li_2O$, $Na_2O$ and $K_2O$ is in the range of from 25 to 45 mole percent, the total amount of $Li_2O$, $Na_2O$ and $K_2O$ is in the range of up to 10 percent by weight except when the only alkali metal oxide present is $Li_2O$, and the composition has a coefficient of thermal expansion in the range of from 4.0 to $7.0 \times 10^{-6}$/°C. These glass flux compositions are of particular use in the preparation of enamel compositions for the decoration of low-expansion porcelain ware.

16 Claims, No Drawings

GLASS COMPOSITIONS

BACKGROUND OF THE INVENTION

The present invention relates to glass compositions and, in particular, to glass compositions which are of minimal toxicity and are substantially free of lead and cadmium and which can be used as fluxes for mixing with pigments to provide compositions for the decoration of low-expansion ceramic materials and/or glass.

THE PRIOR ART

Occasional episodes of lead poisoning have resulted from the use of improperly formulated and fired lead-containing glasses and/or fluxes on ceramic ware. Whilst lead-containing glasses and fluxes can be prepared which are safe, and meet current requirements for permissible lead release to food with which they come into contact, the problem of lead poisoning is avoided if lead itself is avoided. In addition, various pollution controls regarding the use of lead and limits on the content of lead in waste water can be avoided by the use of lead-free glazes and fluxes.

In the ceramic art, a flux is typically defined as a low-fusion glass which is mixed with a pigment to produce a colour for decoration, either directly on the unglazed ceramic ware (underglaze decoration) or on the glazed ceramic ware (on-glaze and in-glaze decoration).

Ceramic ware falls into many different categories but may loosely be categorised as either high-expansion or soft tableware, encompassing bone china, fine china, hotelware and earthenware, and low-expansion or hard porcelain ware. Typical glaze-firing temperatures for high expansion (5.8–8.5×$10^{-6}$/°C.) tableware are in the region of from 1050°–1150° C., while low expansion (4.0–5.5×$10^{-6}$/°C.) porcelain is glazed at temperatures in the region of from 1350°–1450° C. The compositions of the glass fluxes are chosen to produce colours for decoration which have well-defined properties such as adhesion to the substrate, a thermal expansion to match that of the substrate, maturation in the region of from 750° C.–950° C., gloss and resistance to chemical attack. The thermal expansion requirements for fluxes for decorating hard porcelain are more demanding than those for soft tableware because constituents added to the flux to achieve low fusion or maturation temperatures invariably increase the thermal expansion.

Because of this difficulty in obtaining enamels of appropriately low coefficients of thermal expansion (CTE'S), stress driven defects such as cracking and crazing of enamels on porcelain substrates are commonly observed. In order to overcome this problem, porcelain tableware manufacturers have been either obliged to underfire the enamels, to restrict themselves to thin coatings, or to fire at higher temperatures so that the enamels are fired in-glaze. All of these routes suffer from certain disadvantages. Underfiring of the enamels has the net effect of making the enamels more compliant by virtue of greater porosity in the coating, but gives reduced gloss. With thin coatings, crazing is reduced due to a reduced likelihood of encountering crack propagating flaws, but has the drawback of enabling only weaker colours to be produced. Whilst firing in-glaze minimises the residual stress, because of increased chemical interaction between the enamel and the glaze, the net result is, however, the production of colours of reduced gloss and definition. Accordingly, all of these approaches are no more than damage-limitation exercises which compromise the quality of the final product. Various attempts have been made to produce lead-free fluxes for mixing with pigments to provide compositions for the decoration of ceramic material and glass. U.S. Pat. No. 4,282,035 and U.S. Pat. No. 4,446,241 disclose Pb- and Cd- free glass frits for use in enamels which are based within the $R_2O$-RO-$Al_2O_3$-$ZrO_2$ (where $R_2O$ is an alkali metal oxide and RO is an alkaline earth metal oxide) and $Li_2O$-$B_2O_3$-$SiO_2$ systems, respectively. U.S. Pat. No. 4,590,171 describes Pb- and Ca- free glass frits suitable for use in enamels in contact with foodstuffs which contain $Li_2O$, $Na_2O$, BaO, $B_2O_3$, $Al_2O_3$, $SiO_2$, $ZrO_2$ and F as essential ingredients.

U.S. Pat. No. 4,554,258 describes glass frit compositions which are free of lead, arsenic and cadmium for use in decorative tableware enamels, and which consist of the following components, in parts by weight:

| | |
|---|---|
| $Bi_2O_3$ | 48–57 |
| $SiO_2$ | 29–38 |
| $B_2O_3$ | 3–8 |
| $R_2O$ | 2–8 |
| $TiO_2$ | 0–2 |
| $ZrO_2$ | 0–8 |
| $Al_2O_3$ | 0–2 |
| BaO | 0–4 |
| ZnO | 0–3 |
| CaO | 0–9 |

U.S. Pat. No. 4,892,847 discloses Pb-free glass frits suitable for use in decorative enamels on glassware and on chinaware, which contain the following components, in parts by weight:

| | |
|---|---|
| $SiO_2$ | 25–35 |
| $Bi_2O_3$ | 25–43 |
| $B_2O_3$ | 12–25 |
| alkali metal oxide | 4–19 |
| $ZrO_2$ | 0–3 |
| $TiO_2$ | 0–5 |
| ZnO | 0–6 |
| CaO | 0–4 |
| SrO | 0–15 |
| BaO | 0–19 |
| $Al_2O_3$ | 0–4 |
| $NO_2$ | 0–10 |
| $WO_3$ | 0–1 |
| $Ce_2O_3$ | 0–1.5 |
| $Cr_2O_3$ | 0–7 |
| CoO | 0–15 |
| MnO | 0–8 |
| $P_2O_5$ | 0–10 |

EP-A-267154 describes Pb and Cd-free glass frit compositions for enamel decoration which consist of the following components in terms of moles per cent:

| | |
|---|---|
| $Na_2O$ | 3.9–18.5 |
| ZnO | 4.0–30.0 |
| $B_2O_3$ | 3.9–17.5 |
| $SiO_2$ | 40.0–74.0 |
| $K_2O$ | 0–8.0 |
| $Li_2O$ | 0–5.0 |
| CaO | 0–8.0 |
| SrO | 0–8.0 |
| BaO | 0–9.0 |
| $Bi_2O_3$ | 0–10.0 |
| $Al_2O_3$ | 0–4.0 |
| $ZrO_2$ | 0–6.0 |
| $TiO_2$ | 0–7.0 |
| $WO_3$ | 0–1.0 |

While all the aforementioned glasses are alleged to have many desirable properties, their widespread use as glassy fluxes is limited by shortcomings in certain key areas.

A glassy flux to be used for on-glaze enamel decoration must simultaneously satisfy a number of key requirements. Firstly, the softening point of the flux should be such as to allow maturation within the temperature range of from 750° to 930° C., which are typical on-glaze enamelling temperatures for decoration on soft and hard porcelain tableware pieces.

Secondly, the glassy flux should be compatible with a wide variety of colourants.

Thirdly, the glassy flux should remain stable as a single phase glass, as both phase separation and partial crystallisation, particularly if uncontrolled, can lead to opacity, mattness and poor colour development of the fired enamel.

Fourthly, the physical, thermal and mechanical properties of the glass flux should be such as to produce enamels which, on firing, produce adherent and crack-free coatings on the underlying glazed ware.

Finally, the durability of the glassy flux should be such as to enable the fired colours to withstand attack by acidic foodstuffs and alkali detergents. With controls on permissible levels of metal release into acidic and alkali solutions becoming more stringent, more exacting demands are being placed on the durability requirements of decorated pieces. However, if the end use of the pieces is as display or collector items, then the durability requirement is less critical.

In the light of the present invention, it is important to stress that it is the durability of the final product, i.e fired colour, which is of concern, not that of the glassy frit which may change in use.

The core glass system for U.S. Pat. Nos. 4,554,258 and 4,892,842 is $R_2O$-$Bi_2O_3$-$B_2O_3$-$SiO_2$ whilst for EP-A-267154, it is $Na_2O$-$ZnO$-$B_2O_3$-$SiO_2$.

In our EP-A-0518610, we have described a flux which is particularly suitable for use in the decoration of high expansion tableware, which is based on the basic glass system

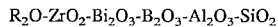

$R_2O$-$ZrO_2$-$Bi_2O_3$-$B_2O_3$-$Al_2O_3$-$SiO_2$ and which comprises:

|  | Mole Percent |
| --- | --- |
| $SiO_2$ | 35–75 |
| $Bi_2O_3$ | 0.1–15 |
| $Al_2O_3$ | 0.1–10 |
| $B_2O_3$ | 1–30 |
| rare earth oxide | 0–20 |
| at least one of $Li_2O$, $Na_2O$, $K_2O$ | 5–30 (in total) |
| optionally one or more of ZnO, MgO, CaO, SrO, BaO | 0–10 (in total) |
| $ZrO_2$ | 0.1–10 |
| $TiO_2$ | 0–5 |
| $WO_3$ | 0–5 |
| $MoO_3$ | 0–5 |
| optionally one or more of $Y_2O_3$, $HfO_2$, $Nb_2O_5$, $SnO_2$ | 0–10 (in total) | with the proviso that ZnO and BaO are each not contained in an amount of more than 2 mole percent. The basic glass system of the present invention is $Bi_2O_3$-$B_2O_3$-$Al_2O_3$-$SiO_2$ and is outside the scope of the prior art both in terms of the precise compositions themselves, and in terms of the unique properties acheivable with glasses based on these compositions.

The glass composition which we have now developed can be used as a flux which simultaneously meets, or at least substantially meets, the aforementioned key requirements, specifically for use in the decoration of hard (low expansion) porcelain ware.

SUMMARY OF THE INVENTION

We have found that a compositional window exists in the $Bi_2O_3$-$B_2O_3$-$Al_2O_3$-$SiO_2$ system which provides a flux which may be used to prepare enamels of low coefficients of thermal expansion which are appropriate for the decoration of porcelain ware, without increasing the maturation temperature of the enamel.

Accordingly the present invention provides an on-glaze low expansion glass flux composition suitable for coating onto a glazed surface which is essentially free from lead and cadmium and which consists of the following components:

|  | Mole % |
| --- | --- |
| $SiO_2$ | 35–75 |
| $Bi_2O_3$ | 4–12 |
| $Al_2O_3$ | 2–12 |
| $B_2O_3$ | 18–35 |
| rare earth oxide | 0–5 |
| at least one of $Li_2O$, $Na_2O$, $K_2O$ | 0–12 (in total) |
| optionally one or more of ZnO, MgO, CaO, SrO, BaO | 0–10 (in total) |
| $ZrO_2$ | 0–5 |
| $TiO_2$ | 0–5 |
| $WO_3$ | 0–5 |
| $MoO_3$ | 0–5 |
| optionally one or more of $Y_2O_3$, $HfO_2$, $Ta_2O_5$, $Nb_2O_5$, $SnO_2$ | 0–5 (in total) |
| $P_2O_5$ | 0–10 |
| $V_2O_5$ | 0–3 | with the provisos that BaO is not contained in an amount of more than 2 mole percent, the total amount of $Bi_2O_2$+$B_2O_3$+$Li_2O$,$Na_2O$ and/or $K_2O$ is in the range of from 25 to 45 mole percent, the total amount of $Li_2O$, $Na_2O$ and/or $K_2O$ is in the range of up to 10 mole percent except when the only alkali metal oxide present is $Li_2O$, and the composition has a coefficient of thermal expansion in the range of from 4.0 to $7.0 \times 10^{-6}$/°C.

The coefficients of thermal expansion of the various glass compositions of the present invention lie within the range of from 4.0 to $7.0 \times 10^{-6}$/°C., preferably 5.0 to $6.0 \times 10^{-6}$/°C., with dilatometric softening points in the region of from 400° to 600° C.

The $SiO_2$ based glass of the present invention relies on both $B_2O_3$ and $Bi_2O_3$ to reduce the fusion temperature of the glass, and upon $Al_2O_3$ to suppress phase separation. Too much $B_2O_3$ is undesirable because it lowers the durability, which not only effects the durability of the fired enamel, but also poses a problem in preparing the glass powder from the glass frit by conventional wet milling methods. The partial replacement of $B_2O_3$ with the relatively durable $Bi_2O_3$ is therefore beneficial to durability. Bismuth oxide also confers the advantage of reducing residual stress levels in the fired enamel by lowering the Young's Modulus of Elasticity, but too much $Bi_2O_3$ is equally undesirable since it attacks certain pigment bases and raises the overall CTE. The levels of $B_2O_3$ and $Bi_2O_3$ in the compositions of the present invention must be balanced and chosen so as to give a low thermal expansion composition with a CTE falling within the above stated limits.

Additions of alkali oxides are desirable in helping to reduce the glass fusion temperature still further and in improving the wetting of a porcelain glaze surface and the gloss of the fired enamel. However, alkali oxides are the biggest single contributor to increasing the CTE and, accordingly, must not be present in high concentrations. In this respect, $Li_2O$ is preferred as the alkali oxide addition as the use of $Na_2O$ and $K_2O$ is more restricted due to their greater effect on increasing CTE. Unfortunately, exceptionally high levels of $Li_2O$ in the glass move the system into the domain of crystallising glasses, with Li-Al-Si-O phases precipitating out.

In accordance with the invention therefore the total amount of the oxides $B_2O_3+Bi_2O_3+Li_2O$, $Na_2O$ and/or $K_2O$ is in the range of from 25 to 45 mole percent. Furthermore, the total amount of $Li_2O$, $Na_2O$ and/or $K_2O$ is limited to an amount of up to 10 mole percent, except in the case when the sole alkali oxide is $Li_2O$, when the upper limit is 12 mole percent.

The glass composition of the present invention preferably comprises above 5 mole percent of $Bi_2O_3$; from 45 to 60 mole percent of $SiO_2$; from 3 to 10 mole percent of $Al_2O_3$; up to 8 mole percent in total of at least one of $Li_2O$, $Na_2O$ and/or $K_2O$; and one or more of ZnO, MgO, CaO, SrO or BaO in an amount in total of up to 5 mole percent.

The compositions of the present invention may include $ZrO_2$ in order to improve the resistance of the compositions to attack by alkali and detergent solutions. The preferred amount of $ZrO_2$ for use in the glass flux compositions of the present invention is from 0.1 to 3.0 mole percent. The compositions may also contain $TiO_2$ in order to improve the resistance of the compositions to acid attack. The preferred amount of $TiO_2$ for use in the present invention is from 0.1 to 3.0 mole percent.

The compositions of the present invention may include $P_2O_5$ in an amount of up to 10 mole percent, preferably up to 5 mole percent.

The glasses of the invention can be prepared from natural (beneficiated) rocks and minerals e.g. limestone, silica sand etc. as well as "fine chemicals".

The various minerals and/or oxides used in the preparation of the compositions of the present invention are usually in the form of fine powders. Precursors of these oxides can also be useful, providing that they decompose to form the required oxides at temperatures below the melting temperature of the glass. Suitable "fine chemical" precursors are the nitrites, nitrates, carbonates, metal organic salts, for example citrates, acetates, etc.

The glass of the present invention may be prepared by mixing together materials, charging the mixture of materials to a glass melting furnace at a temperature sufficiently high to produce the fluxed glass and then fritting the glass by pouring it into water, or by passing it through water cooled rolls.

It may be preferred to carry out the melting and fritting operation in an oxidising atmosphere, or to include an oxygen rich component in the mixture which is melted and fused. The frit may be ground into a powder by conventional grinding techniques.

The glasses of the present invention are preferably fluxes which are used in combination with one or more pigments as a colour on ceramic materials, in particular low-expansion porcelain or glass.

It will be understood by those skilled in the art that for use as a flux, the glass compositions must mature or yield a smooth continuous surface at temperatures below the melting temperatures of the glazes on the ceramic articles on which they are to be used. Generally, the glass compositions will melt at a temperature of below 1150° C., preferably at a temperature in the range of from 900° to 1100° C.

The present invention thus includes within its scope a composition for the decoration of ceramic materials and/or glasses which comprise a glass frit as hereinbefore described in admixture with one or more pigments, or other colourants such as metallic crystallites. The composition for the decoration of ceramic materials and/or glass may additionally contain an organic medium therein, for the purpose of making decorative inks suitable for silk-screen printing or pad printing.

It will be understood by those skilled in the art that although the flux is customarily the major component, it is not only the enamel flux which controls the CTE of the enamel, as the minor component colourant phase will also contribute to the overall CTE. Therefore to achieve low-expansion enamels, the low-expansion flux as herein described should be used preferably in association with colourant phases of comparable or lower CTE's. Furthermore, the colourant phase should be of a fine particle size (90<16 μm) and well dispersed in the glass flux to avoid the creation of crack-nucleating flaws.

The fluxes of the present invention are compatible both with conventional glazes on ceramic materials and with the bismuth based glazes which are described in our European Patent Application No.91303072.2.

The fluxes of the present invention give good colour development, i.e. the colour of the pigment is bright and "sharp" and is not adversely affected by the flux.

The present invention will be further described with reference to the following non-limiting Examples.

EXAMPLE 1

A glass frit was prepared by fusing a mixture of the following materials at 1400° C. and fritting the glass so-produced by pouring in into water:

|  | Mole % | Wt % |
| --- | --- | --- |
| $SiO_2$ | 58.36 | 33.89 |
| $Bi_2O_3$ | 9.34 | 42.04 |
| $B_2O_3$ | 24.83 | 16.70 |
| $Al_2O_3$ | 7.48 | 7.37 |

The coarse frit was ground to give a particle size distribution of 90% less than 16 micrometres.

The coefficient of thermal expansion (CTE) of a fused bar of the frit was measured to be $5.3 \times 10^{-6}$/°C. (25°–500° C.).

Using finely ground pigment (90≦3.2 μm) and a pigment to glass frit ratio of 1:5 by weight, brown (Cr-Mn-Zn-Si oxide) and lilac (Sn-Cr oxide) colours were prepared, silk-screen printed and fired onto Limoges porcelain at a heating rate of 13° C. per minute to 820° C., with a dwell time of 20 minutes. The resulting colours were glossy, adherent and crack-free, and possessed acceptable durability in 5% acetic acid at room temperature and in 0.5% Calgonite (commercial dishwater detergent) solution at 78° C.

EXAMPLE 2

Following the procedure of Example 1, a glass frit was prepared from the following components:

|  | Mole % | Wt % |
| --- | --- | --- |
| $SiO_2$ | 60.48 | 40.97 |
| $Bi_2O_3$ | 5.94 | 31.06 |
| $B_2O_3$ | 24.08 | 18.90 |
| $Al_2O_3$ | 2.98 | 3.43 |
| $Li_2O$ | — | — |
| MgO | 3.70 | 1.68 |
| $TiO_2$ | — | — |

-continued

|  | Mole % | Wt % |
|---|---|---|
| $ZrO_2$ | 2.85 | 3.96 |

The coefficient of thermal expansion for this frit was (25°–500° C.) $5.2\times10^{-6}$/°C. Using a pigment to glass flux ratio of 1:3 by weight, an orange (Ti-Cr-Sb oxide) colour was prepared, silk-screen printed and fired onto Limoges porcelain at a heating rate of 13° C./Min to 950° C., with a dwell time of 20 minutes. The resultant colour was glossy, adherent and crack-free, and possessed acceptable acid (acetic) and alkaline (Calgonite) durability.

EXAMPLES 3 and 4

Glass frits made from the following constituents were prepared according to the procedure of Example 1.

|  | Example 3 | | Example 4 | |
|---|---|---|---|---|
|  | Mole % | Wt % | Mole % | Wt % |
| $SiO_2$ | 52.88 | 28.53 | 60.96 | 33.29 |
| $Bi_2O_3$ | 11.37 | 47.58 | 11.24 | 47.58 |
| $B_2O_3$ | 30.44 | 19.08 | 22.55 | 14.27 |
| $Al_2O_3$ | 5.31 | 4.86 | 5.25 | 4.86 |

The CTE's (25°–500° C.) of the glass frits were $6.4\times10^{-6}$/°C. for Example 3 and $6.4\times10^{-6}$/°C. for Example 4, respectively. Following the procedure of Example 1, brown (Si-Cr-Mn-Zn oxide) and turquoise (Zr-Si-V oxide) colours were prepared using a pigment to frit ratio of 1:5 by weight, silk screen printed and fired onto Limoges porcelain as described in Example 1. The resultant colours were glossy, adherent and showed no loss of gloss following immersion in a static 0.5 wt % Finish (commercial dishwater detergent) solution for 72 hours at 77° C.

EXAMPLES 5 TO 32

Following the procedure of Example 1, glass frits were prepared from the oxides as listed in Tables 1 to 6.

The CTE measurements (25°–250° C.) of the glass frits are given in the respective Tables.

Using a pigment to glas flux ratio of 1 part by weight pigment to 5 parts by weight glass flux, yellow (Pr-Zr-Si) colours were prepared, printed and fired according to the procedure of Example 1.

The fired appearance of the colours was assessed according to the following scale:

M Matt
S Satin
G Gloss

TABLE 1

|  | Example 5 | | Example 6 | | Example 7 | | Example 8 | | Example 9 | |
|---|---|---|---|---|---|---|---|---|---|---|
|  | Mole % | Wt % | Mole % | Wt % | Mole % | Wt % | Mole % | Wt % | Mole % | Wt % |
| $SiO_2$ | 58.98 | 40.73 | 60.32 | 40.81 | 60.29 | 40.74 | 60.00 | 40.03 | 58.38 | 40.29 |
| $Bi_2O_3$ | 5.76 | 30.87 | 5.93 | 31.14 | 5.90 | 30.89 | 5.90 | 30.53 | 5.74 | 30.74 |
| $B_2O_3$ | 23.48 | 18.79 | 24.17 | 18.95 | 20.24 | 15.84 | 24.04 | 18.58 | 23.39 | 18.71 |
| $Al_2O_3$ | 2.91 | 3.41 | 3.0 | 3.44 | 5.55 | 6.37 | 2.98 | 3.37 | 2.90 | 3.40 |
| $Li_2O$ | — | — | — | — | — | — | — | — | — | — |
| $Na_2O$ | 2.15 | 1.53 | — | — | 2.20 | 1.54 | — | — | 2.15 | 1.53 |
| MgO | 5.09 | 2.36 | 3.72 | 1.69 | 3.69 | 1.67 | 3.70 | 1.65 | 3.60 | 1.66 |
| $ZrO_2$ | 1.63 | 2.31 | 2.86 | 3.97 | 2.13 | 2.95 | 2.84 | 3.89 | 2.77 | 2.69 |
| $TiO_2$ | — | — | — | — | — | — | — | — | 1.07 | 0.98 |
| $La_2O_3$ | — | — | — | — | — | — | 0.54 | 1.95 | — | — |
| Fired Appea-rance | S | | M | | S/G | | M | | M/S | |
| CTE ($\times 10^{-6}$/°C.) | 5.7 | | 5.2 | | 5.7 | | 5.2 | | 5.6 | |

TABLE 2

|  | Example 10 | | Example 11 | | Example 12 | | Example 13 | |
|---|---|---|---|---|---|---|---|---|
|  | Mole % | Wt % | Mole % | Wt % | Mole % | Wt % | Mole % | Wt % |
| $SiO_2$ | 51.25 | 34.11 | 64.37 | 48.15 | 62.73 | 47.82 | 60.30 | 45.39 |
| $Bi_2O_3$ | 6.08 | 31.39 | 4.37 | 25.32 | 4.21 | 24.86 | 4.27 | 24.94 |
| $B_2O_3$ | 25.94 | 20.00 | 21.02 | 18.21 | 20.48 | 18.09 | 18.30 | 15.96 |
| $Al_2O_3$ | 4.43 | 5.00 | 2.37 | 3.00 | 2.30 | 2.98 | 3.91 | 4.99 |
| $Li_2O$ | 4.53 | 1.50 | 5.38 | 2.00 | 7.86 | 2.98 | 9.99 | 3.74 |
| $Na_2O$ | — | — | — | — | — | — | — | — |
| $ZrO_2$ | 2.20 | 3.00 | 1.50 | 2.30 | 1.46 | 2.28 | 3.23 | 4.98 |
| $TiO_2$ | 1.33 | 1.00 | — | — | — | — | — | — |
| ZnO | 4.44 | 4.00 | 0.99 | 1.00 | 0.96 | 0.99 | — | — |
| Fired | M | | S/G | | G | | G | |

TABLE 2-continued

| | Example 10 | | Example 11 | | Example 12 | | Example 13 | |
|---|---|---|---|---|---|---|---|---|
| | Mole % | Wt % | Mole % | Wt % | Mole % | Wt % | Mole % | Wt % |
| Appearance | | | | | | | | |
| CTE ($\times 10^{-6}$/°C.) | 5.8 | | 5.3 | | 5.7 | | 6.1 | |

TABLE 3

| | Example 14 | | Example 15 | | Example 16 | | Example 17 | |
|---|---|---|---|---|---|---|---|---|
| | Mole % | Wt % | Mole % | Wt % | Mole % | Wt % | Mole % | Wt % |
| $SiO_2$ | 60.63 | 42.15 | 62.90 | 40.74 | 61.53 | 40.74 | 62.60 | 41.28 |
| $Bi_2O_3$ | 5.97 | 32.16 | 7.13 | 35.81 | 6.59 | 33.84 | 6.12 | 31.50 |
| $B_2O_3$ | 24.29 | 19.57 | 18.49 | 13.88 | 20.65 | 15.84 | 21.02 | 16.15 |
| $Al_2O_3$ | 3.01 | 3.56 | 3.11 | 3.42 | 3.04 | 3.42 | 5.76 | 6.49 |
| $Li_2O$ | 2.37 | 0.82 | — | — | — | — | — | — |
| $Na_2O$ | — | — | 2.30 | 1.53 | 2.25 | 1.54 | 2.29 | 1.57 |
| MgO | 3.73 | 1.74 | 3.85 | 1.67 | 3.77 | 1.67 | — | — |
| $ZrO_2$ | — | — | 2.22 | 2.95 | 2.18 | 2.95 | 2.21 | 3.01 |
| Fired Appearance | S/G | | M/S | | S/G | | S | |
| CTE ($\times 10^{-6}$/°C.) | 5.4 | | 6.2 | | 6.0 | | 5.6 | |

TABLE 4

| | Example 18 | | Example 19 | | Example 20 | | Example 21 | | Example 22 | |
|---|---|---|---|---|---|---|---|---|---|---|
| | Mole % | Wt % | Mole % | Wt % | Mole % | Wt % | Mole % | Wt % | Mole % | Wt % |
| $SiO_2$ | 62.38 | 42.53 | 57.55 | 40.10 | 52.74 | 30.56 | 57.38 | 33.72 | 54.59 | 33.23 |
| $Bi_2O_3$ | 6.10 | 32.24 | 5.95 | 32.16 | 9.25 | 41.57 | 9.18 | 41.85 | 8.73 | 41.23 |
| $B_2O_3$ | 20.80 | 16.44 | 24.24 | 19.57 | 30.52 | 20.49 | 24.42 | 16.63 | 23.23 | 16.38 |
| $Al_2O_3$ | 2.66 | 3.08 | 3.01 | 3.56 | 7.49 | 7.37 | 7.32 | 7.30 | 6.97 | 7.20 |
| $Li_2O$ | 4.73 | 1.60 | 2.37 | 0.82 | — | — | 1.70 | 0.50 | 6.48 | 1.96 |
| $Na_2O$ | — | — | — | — | — | — | — | — | — | — |
| MgO | — | — | 3.73 | 1.74 | — | — | — | — | — | — |
| $ZrO_2$ | 2.20 | 3.08 | — | — | — | — | — | — | — | — |
| $TiO_2$ | 1.13 | 1.03 | — | — | — | — | — | — | — | — |
| CaO | — | — | 3.15 | 2.05 | — | — | — | — | — | — |
| Fired Appearance | S/G | | S/G | | M | | G | | G | |
| CTE ($\times 10^{-6}$/°C.) | 5.7 | | 5.8 | | 5.8 | | 6.1 | | 6.6 | |

TABLE 5

| | Example 23 | | Example 24 | | Example 25 | | Example 26 | | Example 27 | | Example 28 | |
|---|---|---|---|---|---|---|---|---|---|---|---|---|
| | Mole % | Wt % | Mole % | Wt % | Mole % | Wt % | Mole % | Wt % | Mole % | Wt % | Mole % | Wt % |
| $SiO_2$ | 56.25 | 33.40 | 57.74 | 33.56 | 55.80 | 33.07 | 56.11 | 33.23 | 53.81 | 31.58 | 51.16 | 29.60 |
| $Bi_2O_3$ | 8.99 | 41.48 | 9.24 | 41.63 | 8.93 | 41.03 | 8.98 | 41.23 | 9.29 | 41.64 | 9.28 | 41.64 |
| $B_2O_3$ | 23.93 | 16.47 | 24.57 | 16.55 | 23.74 | 16.30 | 23.87 | 16.38 | 24.32 | 16.54 | 24.68 | 16.54 |

TABLE 5-continued

|  | Example 23 | | Example 24 | | Example 25 | | Example 26 | | Example 27 | | Example 28 | |
| --- | --- | --- | --- | --- | --- | --- | --- | --- | --- | --- | --- | --- |
|  | Mole % | Wt % | Mole % | Wt % | Mole % | Wt % | Mole % | Wt % | Mole % | Wt % | Mole % | Wt % |
| $Al_2O_3$ | 7.18 | 7.23 | 7.37 | 7.27 | 7.12 | 7.16 | 7.16 | 7.20 | 9.15 | 9.25 | 11.44 | 11.23 |
| $Li_2O$ | 3.32 | 0.98 | — | — | — | — | 3.33 | 0.98 | 3.43 | 0.99 | 3.44 | 0.99 |
| $Na_2O$ | — | — | — | — | — | — | — | — | — | — | — | — |
| $K_2O$ | — | — | 1.08 | 0.99 | — | — | — | — | — | — | — | — |
| $ZrO_2$ | — | — | — | — | — | — | — | — | — | — | — | — |
| CaO | — | — | — | — | 4.41 | 2.44 | — | — | — | — | — | — |
| $SnO_2$ | 0.33 | 0.49 | — | — | — | — | — | — | — | — | — | — |
| $V_2O_5$ | — | — | — | — | — | — | 0.55 | 0.98 | — | — | — | — |
| Fired Appearance | G | | G | | G | | G | | S/G | | M | |
| CTE ($\times 10^{-6}$/°C.) | 6.2 | | 6.2 | | 6.2 | | 6.2 | | 6.2 | | 6.3 | |

TABLE 6

|  | Example 29 | | Example 30 | | Example 31 | | Example 32 | |
| --- | --- | --- | --- | --- | --- | --- | --- | --- |
|  | Mole % | Wt % | Mole % | Wt % | Mole % | Wt % | Mole % | Wt % |
| $SiO_2$ | 62.39 | 42.77 | 57.44 | 39.61 | 60.61 | 42.22 | 60.17 | 42.12 |
| $Bi_2O_3$ | 5.20 | 21.63 | 4.63 | 24.75 | 5.05 | 27.28 | 5.08 | 27.60 |
| $B_2O_3$ | 18.21 | 14.46 | 21.08 | 16.83 | 18.77 | 15.15 | 18.32 | 14.86 |
| $Al_2O_3$ | 4.53 | 5.27 | 5.93 | 6.93 | 4.56 | 5.40 | 5.12 | 6.08 |
| $Li_2O$ | 0.38 | 0.13 | — | — | 3.69 | 1.28 | 4.71 | 1.64 |
| $Na_2O$ | 1.94 | 1.37 | 2.78 | 1.98 | — | — | — | — |
| ZnO | 2.95 | 2.74 | 5.30 | 4.95 | 4.18 | 3.94 | 4.06 | 3.85 |
| $ZrO_2$ | 1.95 | 2.74 | 2.10 | 2.97 | 2.20 | 3.15 | 1.61 | 2.31 |
| SrO | 2.45 | 2.89 | — | — | — | — | — | — |
| $WO_3$ | — | — | 0.74 | 1.98 | — | — | — | — |
| $P_2O_5$ | — | — | — | — | — | — | 0.93 | 1.54 |
| $MoO_3$ | — | — | — | — | 0.94 | 1.58 | — | — |
| Fired Appearance | M | | M | | M/S | | S | |
| CTE ($\times 10^{-6}$/°C.) | 5.7 | | 5.4 | | 5.5 | | 5.5 | |

We claim:

1. An on-glaze low expansion glass flux composition suitable for coating onto a glazed surface which is essentially free from lead and cadmium and which consists of the following components:

|  | Mole % |
| --- | --- |
| $SiO_2$ | 35–75 |
| $Bi_2O_3$ | 4–12 |
| $Al_2O_3$ | 2–12 |
| $B_2O_3$ | 18–35 |
| rare earth oxide | 0–5 |
| at least one of $Li_2O$, $Na_2$, $K_2O$ | up to 12 (in total) |
| optionally at least one of ZnO, MgO, CaO, SrO, BaO | 0–10 (in total) |
| $ZrO_2$ | 0–5 |
| $TiO_2$ | 0–5 |
| $WO_3$ | 0–5 |
| $MoO_3$ | 0–5 |
| optionally at least one of $Y_2O_3$, $HfO_2$, $Ta_2O_5$, $Nb_2O_5$, $SnO_2$ | 0–5 (in total) |
| $P_2O_5$ | 0–10 |
| $V_2O_5$ | 0–3 | with the provisos that BaO is not contained in an amount of more than 2 mole percent, the total amount of $Bi_2O_3+B_2O_3+Li_2O$, $Na_2O$ and $K_2O$ is in the range of from 25 to 45 mole percent, the total amount of $Li_2O$, $Na_2O$ and $K_2O$ is in the range of up to 10 percent by weight except when the only alkali metal oxide present is $Li_2O$, and the composition has a coefficient of thermal expansion in the range of from 4.0 to $7.0 \times 10^{-6}$/°C.

2. Glass flux composition according to claim 1 which comprises above 5 mole percent $Bi_2O_3$.

3. Glass flux composition according to claim 1 which comprises from 45 to 60 mole percent of $SiO_2$.

4. Glass flux composition according to claim 1 which comprises from 3 to 10 mole percent of $Al_2O_3$.

5. Glass flux composition according to claim 1 which comprises at least one alkali metal oxide selected from the group consisting of $Li_2O$, $Na_2O$ and $K_2O$ in an amount of up to 8 mole percent in total.

6. Glass flux composition according to claim 1 which comprises from 0.1 to 3.0 mole percent of $ZrO_2$.

7. Glass flux composition according to claim 1 which comprises from 0.1 to 3.0 mole percent of $TiO_2$.

8. Glass flux composition according to claim 1 which comprises at least one oxide selected from the group consisting of one or more of ZnO, MgO, CaO, SrO and BaO in an amount in total of up to 5 mole percent.

9. Glass flux composition according to claim 1 which has a coefficient of thermal expansion in the range of from 5.0 to $6.0 \times 10^{-6}$/°C.

10. Glass flux composition according to claim 1 which has a dilatometric softening point in the region of from 400° to 600° C.

11. A composition for the decoration of a material selected from the group consisting of ceramic materials and glass which comprises a glass flux composition suitable for coating onto a glazed surface which is essentially free from lead and cadmium and which consists of the following components:

|  | Mole % |
| --- | --- |
| $SiO_2$ | 35–75 |
| $Bi_2O_3$ | 4–12 |
| $Al_2O_3$ | 2–12 |
| $B_2O_3$ | 18–35 |
| rare earth oxide | 0–5 |
| at least one of $Li_2O$, $Na_2$, $K_2O$ | up to 12 (in total) |
| optionally at least one of ZnO, MgO, CaO, SrO, BaO | 0–10 (in total) |
| $ZrO_2$ | 0–5 |
| $TiO_2$ | 0–5 |
| $WO_3$ | 0–5 |
| $MoO_3$ | 0–5 |
| optionally at least one of $Y_2O_3$, $HfO_2$, $Ta_2O_5$, $Nb_2O_5$, $SnO_2$ | 0–5 (in total) |
| $P_2O_5$ | 0–10 |
| $V_2O_5$ | 0–3 | with the provisos that BaO is not contained in an amount of more than 2 mole percent, the total amount of $Bi_2O_3+B_2O_3+Li_2O,Na_2O$ and $K_2O$ is in the range of from 25 to 45 mole percent, the total amount of $Li_2O,Na_2O$ and $K_2O$ is in the range of up to 10 percent by weight except when the only alkali metal oxide present is $Li_2O$, and the composition has a coefficient of thermal expansion in the range of from 4.0 to $7.0 \times 10^{-6}$/°C., the said composition being in admixture with at least one pigment.

12. Composition according to claim 11 which additionally includes an organic vehicle therein for making inks suitable for silk-screen or pad printing.

13. An article selected from the group consisting of ceramic and glass articles which has been decorated using a composition which is essentially free from lead and cadmium and which consists of the following components:

|  | Mole % |
| --- | --- |
| $SiO_2$ | 35–75 |
| $Bi_2O_3$ | 4–12 |
| $Al_2O_3$ | 2–12 |
| $B_2O_3$ | 18–35 |
| rare earth oxide | 0–5 |
| at least one of $Li_2O$, $Na_2$, $K_2O$ | up to 12 (in total) |
| optionally at least one of ZnO, MgO, CaO, SrO, BaO | 0–10 (in total) |
| $ZrO_2$ | 0–5 |
| $TiO_2$ | 0–5 |
| $WO_3$ | 0–5 |
| $MoO_3$ | 0–5 |
| optionally at least one of $Y_2O_3$, $HfO_2$, $Ta_2O_5$, $Nb_2O_5$, $SnO_2$ | 0–5 (in total) |
| $P_2O_5$ | 0–10 |
| $V_2O_5$ | 0–3 | with the provisos that BaO is not contained in an amount of more than 2 mole percent, the total amount of $Bi_2O_3+B_2O_3+Li_2O,Na_2O$ and $K_2O$ is in the range of from 25 to 45 mole percent, the total amount of $Li_2O,Na_2O$ and $K_2O$ is in the range of up to 10 percent by weight except when the only alkali metal oxide present is $Li_2O$, and the composition has a coefficient of thermal expansion in the range of from 4.0 to $7.0 \times 10^{-6}$/°C., said composition being in admixture with at least one pigment.

14. An article selected from the group consisting of ceramic and glass articles which has been decorated using a composition as claimed in claim 12.

15. A ceramic article as claimed in claim 13 which is low-expansion porcelain ware.

16. A ceramic article as claimed in claim 14 which is a low-expansion porcelain ware.

* * * * *